US012787046B2

(12) United States Patent
Shvodian et al.

(10) Patent No.: US 12,787,046 B2
(45) Date of Patent: Nov. 3, 2026

(54) RESOURCE ALLOCATION BASED ON DEVICE CAPABILITIES

(71) Applicant: T-MOBILE INNOVATIONS LLC, Overland Park, KS (US)

(72) Inventors: William M. Shvodian, McLean, VA (US); Scott Francis Migaldi, Cary, IL (US); Egil Arnfinn Gronstad, Encinitas, CA (US); John Joseph Humbert, IV, Roeland Park, KS (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 212 days.

(21) Appl. No.: 18/886,738

(22) Filed: Sep. 16, 2024

(65) Prior Publication Data

US 2026/0082409 A1 Mar. 19, 2026

(51) Int. Cl.
*H04W 72/51* (2023.01)
*H04W 72/543* (2023.01)

(52) U.S. Cl.
CPC ......... *H04W 72/51* (2023.01); *H04W 72/543* (2023.01)

(58) Field of Classification Search
CPC .... H04W 72/51; H04W 72/543; H04W 48/00
See application file for complete search history.

(56) References Cited

U.S. PATENT DOCUMENTS

2015/0092573 A1 4/2015 Zhang et al.
2020/0053718 A1 2/2020 Huang et al.
2020/0213367 A1* 7/2020 Chiang ............... H04L 65/1089
2021/0076196 A1* 3/2021 Kumar .................. H04W 72/51
2022/0338072 A1* 10/2022 Jia ..................... H04W 72/1268
2023/0006765 A1* 1/2023 Kutz ..................... H04L 1/0033
2023/0254924 A1 8/2023 Jones
2024/0064505 A1* 2/2024 Liang ...................... H04W 8/22

OTHER PUBLICATIONS

Extended European Search Report received for European Application No. 24200457.0, mailed on Jan. 27, 2025, 6 pages.

* cited by examiner

*Primary Examiner* — Nader Bolourchi
(74) *Attorney, Agent, or Firm* — SHOOK, HARDY & BACON L.L.P.

(57) ABSTRACT

Methods and systems for resource allocation in a wireless network based on device capabilities are provided. Based on a determination that one or more capabilities of a UE are below a pre-determined threshold requirement for a band, radio access network node, or mobile network operator (MNO), and based on a determination that one or more trigger conditions are present, the UE will receive a reduced resource allocation. The trigger conditions include band, node, or MNO requirements and/or congestion. The reduced resource allocation can take the form of receiving a lower-priority network slice or a lower-priority quality of service (QoS).

20 Claims, 3 Drawing Sheets

RESOURCE ALLOCATION BASED ON DEVICE CAPABILITIES

SUMMARY

The present disclosure is directed to allocating network resources for limited-capability devices, substantially as shown and/or described in connection with at least one of the Figures, and as set forth more completely in the claims.

According to aspects herein, wireless network resources are allocated to a user equipment (UE) based on a combination of the UE's capabilities and one or more trigger conditions being met. A UE may have capabilities below a predetermined threshold for a band, node, or a mobile network operator (MNO), such as having two receive antennas, a lower baseband processing capability, support for fewer multiple input multiple output (MIMO) layers, support for smaller bandwidths, or a limitation on using more complex modulation coding schemes (MCS). Trigger conditions include accessing a band or node having UE capability requirements that exceed the UE's capabilities, accessing a band or node with high congestion, or a combination thereof. If the UE with limited capabilities requests resources in the presence of one of the trigger conditions, then the UE will be allocated fewer radio resources, such as by assigning a lower-priority network slice or a lower-priority quality of service (QoS) to the UE. By implementing this approach, service impacts on UEs with higher capabilities caused by lower-capability UEs will be mitigated.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE SEVERAL VIEWS OF THE DRAWINGS

Implementations of the present disclosure are described in detail below with reference to the attached drawing figures, wherein.

DETAILED DESCRIPTION

Figure 1:
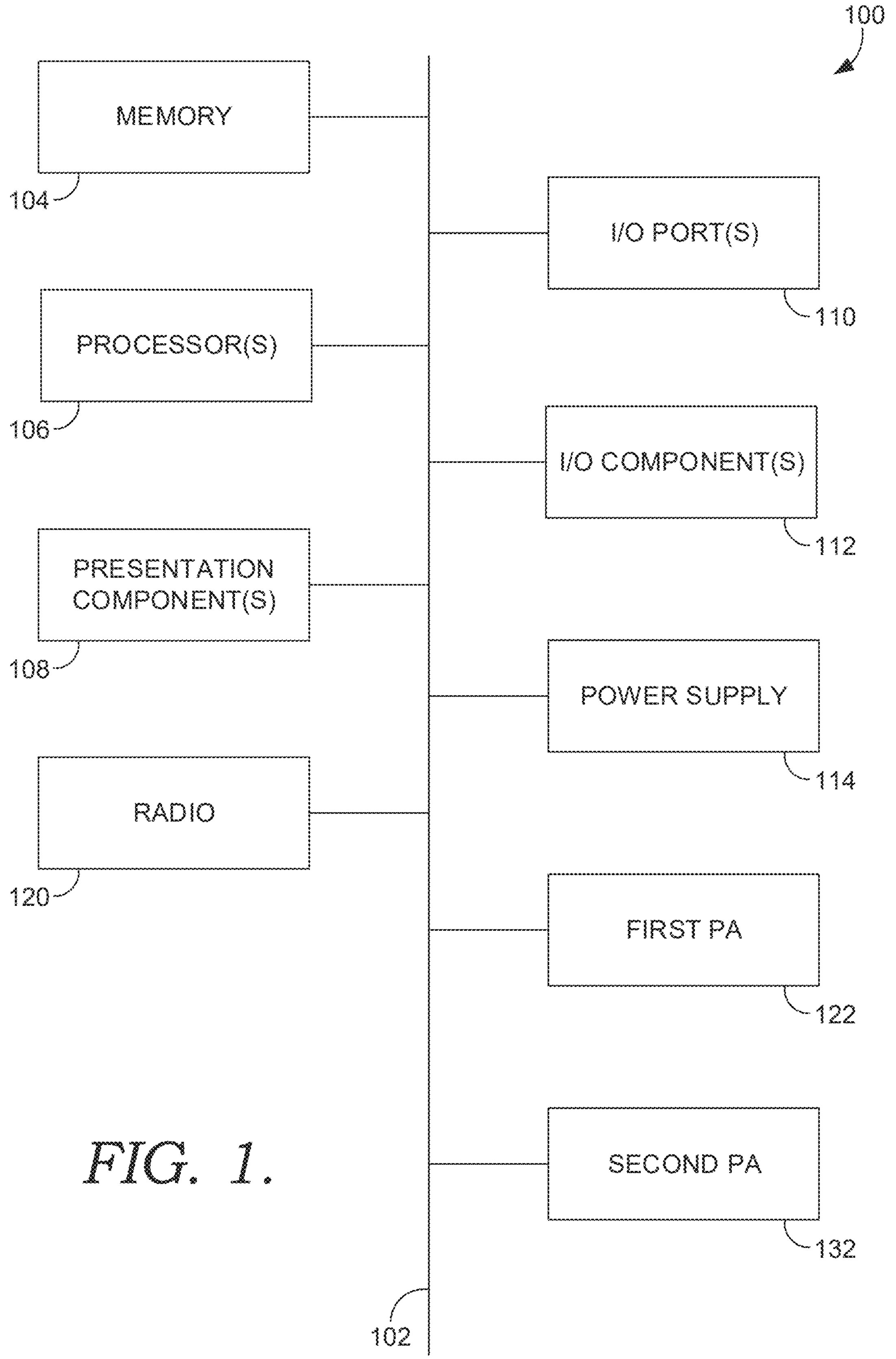
FIG. 1 depicts a computing device suitable for use with implementations of the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the terms "base station" or "access point" refer to a centralized component or system of components that is configured to wirelessly communicate (receive and/or transmit signals) with a plurality of stations (i.e., wireless communication devices, also referred to herein as user equipment (UE(s))) in a particular geographic area. As used herein, the term "network access technology (NAT)" is synonymous with wireless communication protocol and is an umbrella term used to refer to the particular technological standard/protocol that governs the communication between a UE and a base station; examples of network access technologies suitable for use with the present disclosure include but are not limited to 3G, 4G, 5G, 6G, 802.11x, and the like.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, wireless networks often use multiple wireless links to provide communication services to a single UE. Today, some frequency bands (e.g., n7, n38, n41, n77, n78, and n79) require a UE to have four receive antennas, resulting in four receive RF chains. The four receive antenna requirement is mandated by the wireless standards (e.g., TS138.521-1) to ensure sufficient capacity for large numbers of network users and to provide for better diversity gain. Some device manufacturers, particularly manufacturers of wearable and extended reality (XR) devices, oppose the 4-antenna requirement and future wireless networks may or may not have the ability to categorically bar 2-antenna devices from their networks or certain bands they operate. Particularly as the 4-antenna devices proliferate, it would be advantageous to establish protocols for managing devices with limited capabilities—such as devices that only have two receive antennas.

Conventionally, network operators can refuse to allow a UE with only two receive antennas from using a band where the network operator requires four receive antennas, but the network operators do not have mechanisms to allow two receive antenna devices to access frequency bands that are limited to devices with four receive antennas, while minimizing the impact of such devices on the network performance. Unlike conventional solutions, the present disclosure is directed to systems and methods that allow access for UEs with limited capabilities; however, resources are allocated that bias in favor of UEs with higher capabilities. Based on a UE's capabilities and one or more trigger conditions being satisfied, a reduced amount of radio resources are allocated to the UE. The trigger conditions include accessing a band or node requiring higher capabilities, accessing a band or node with high congestion, or a combination thereof.

Accordingly, a first aspect of the present disclosure is directed to a system for network resource allocation. The system comprises a radio access network (RAN) node configured to receive a capability message from a user equipment (UE). The system further comprises one or more computer processing components configured to perform operations. The operations comprise determining, based on the capability message, the UE has one or more capabilities below a pre-determined threshold. The operations further comprise determining that the UE is requesting access to a network resource that requires capabilities greater than or equal to the pre-determined threshold, the network resource being the RAN node or a frequency band of the RAN node. The operations further comprise determining that the network resource has a congestion metric that exceeds a second pre-determined threshold. The operations further comprise based on said determinations, implementing a mitigating resource allocation to the UE.

Another aspect of the present disclosure is directed to a method for network resource allocation. The method comprises receiving a capability message from a user equipment (UE) at a radio access network (RAN) node. The method further comprises determining, based on the capability message, the UE has one or more capabilities below a pre-determined threshold. The method further comprises determining that the network resource has a congestion metric that exceeds a second pre-determined threshold. The method further comprises based on said determinations, implementing a mitigating resource allocation to the UE.

Another aspect of the present disclosure is directed to a method for network resource allocation. The method comprises receiving a capability message from a user equipment (UE) at a radio access network (RAN) node. The method further comprises determining, based on the capability message, the UE has one or more capabilities below a pre-determined threshold. The method further comprises determining that the UE is requesting access to a network resource that requires capabilities greater than or equal to the pre-determined threshold, the network resource being the RAN node or a frequency band of the RAN node. The method further comprises based on said determinations, implementing a mitigating resource allocation to the UE.

Referring to FIG. 1, a representative computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device. The computing device 100 may take the form of a wireless access device that acts as a more localized and consolidated access point that provides end user wireless devices access to a broader network; examples of wireless access devices include fixed wireless access (FWA) devices and mobile hotspots. The computing device 100 may take the form of a mobile device, used herein to refer to categories of often-portable devices that utilize a wireless connection to a broader network and are typically configured for direct human interaction and personal computing tasks; examples of mobile devices include smartphones, tablets, extended reality (XR) devices (e.g., virtual reality, augmented reality, or mixed reality devices), computers (e.g., laptops and PCs), wearable devices (e.g., smartwatches, fitness tracker), electronic readers (i.e., an e-book reader or digital book reader), portable media player, handheld GPS/location device, digital camera, gaming console, and digital voice recorders. The computing device may take the form of a connected vehicle that integrates advanced communication and computing technologies to interact with other devices and networks, encompassing vehicle to vehicle (V2V) communications, vehicle to infrastructure (V2I) communications, and/or vehicle to everything (V2X) communications, and that utilizes a wireless connection to support telematics, infotainment systems, over the air updates, vehicle health monitoring, and/or enhanced navigation; examples of connected vehicles include automotive, locomotive, airborne, and cargo (e.g., train car, semi-trailer) systems. The computing device 100 may take the form of an Internet of Things (IoT) device, a physical object embedded with sensors, software, or other technologies that enable them to collect, exchange, and act on data using an internet connection, which allows them to perform automated, decision-making or, other content-provision tasks; examples of IoT devices include smart home devices (e.g., smart thermostats, smart lights, power supply/management systems, and smart security systems), connected appliances (e.g., smart refrigerators), health monitoring devices (e.g., blood pressure monitor, glucose monitor), industrial devices (e.g., smart sensors, predictive maintenance systems), and agricultural devices (e.g., soil, environmental, or growth sensors).

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as “workstation,” “server,” “laptop,” “handheld device,” etc., as all are contemplated within the scope of FIG. 1 and refer to “computer” or “computing device.”

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media of the computing device 100 may be in the form of a dedicated solid state memory or flash memory, such as a subscriber information module (SIM). Computer storage media does not comprise a propagated data signal.

Communication media typically embodies computer-readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and a second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, 802.11, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VoLTE, or other VoIP communications. In aspects, the first radio 120 and the second radio 130 may be configured to communicate using the same protocol but in other aspects they may be configured to communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 may be configured to communicate with a base station according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2:
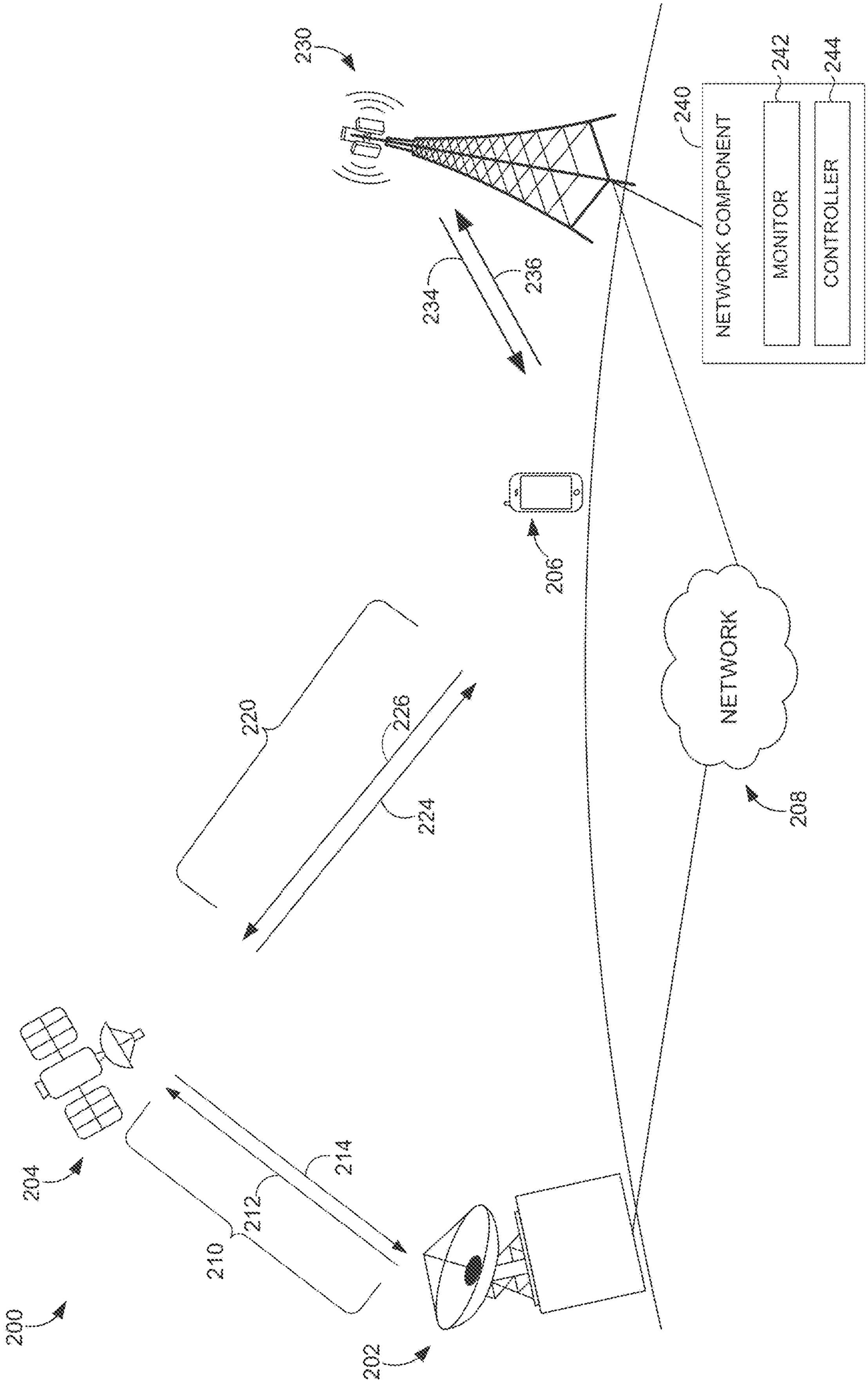
FIG. 2 illustrates a representative network environment for use with implementations of the present disclosure.

Turning now to FIG. 2, an exemplary network environment is illustrated in which implementations of the present disclosure may be employed. Such a network environment is illustrated and designated generally as network environment 200. At a high level the network environment 200 comprises a radio access network (RAN), a UE 206, and a network 208. In aspects of the present disclosure the RAN may take the form of a satellite RAN, which comprises at least a gateway 202 and a satellite 204. In other aspects, the RAN may comprise a terrestrial network comprising at least the terrestrial base station 230. Though both the satellite RAN and terrestrial RAN aspects are illustrated in the network environment 200, it is expressly conceived that the present disclosure may be suitable for use in an environment containing only one of the satellite RAN or the terrestrial RAN. Further, though the composition of network environment 200 illustrates objects in the singular, it should be understood that more than one of each component is expressly conceived as being within the bounds of the present disclosure; for example, the network environment 200 may comprise multiple gateways, multiple distinct networks, multiple UEs, multiple satellites that communicate with a single gateway or multiple gateways, multiple satellites that may have inter-satellite links, multiple terrestrial base stations, and the like. Though certain objects of network environment 200 are illustrated in a certain form, it should also be understood that they may take other forms; for example, even though the UE 206 is illustrated as a cellular phone, a UE suitable for implementations with the present disclosure may be any computing device having any one or more aspects described with respect to FIG. 1, and even though the terrestrial base station 230 is illustrated as a macro cell mounted on a tower, a terrestrial base station suitable for use with the present disclosure is any terrestrial station configured to transmit signals to and receive signals from the UE 206 (e.g., a small cell, pico cell, relay, and the like).

In aspects where the RAN of the network environment 200 is a satellite RAN, the gateway 202 may be said to be communicatively connected to the network 208 and the satellite 204. The gateway 202 may be connected to the network 208 via one or more wireless or wired connections and is connected to the satellite 204 via a feeder link 210. The gateway 202 may take the form of a device or a system of components configured to communicate with the UE 206 via the satellite 204 and to provide an interface between the network 208 and the satellite 204. Generally, the gateway 202 utilizes one or more antennas to transmit signals to the satellite 204 via a forward uplink 212 and to receive signals from the satellite 204 via a return downlink 214. The gateway 202 may communicate with a plurality of satellites, including the satellite 204. The network 208 comprises any one or more public or private networks, any one or more of which may be configured as a satellite network, a publicly switched telephony network (PSTN), or a cellular telecommunications network. In aspects, the network 208 may comprise a satellite network connecting a plurality of gateways (including the gateway 202) to other networks, a cellular core network (e.g., a 4G, 5G, of 6G core network, an IMS network, and the like), and a data network. In such aspects, each of the satellite network and the cellular core network may be associated with a network identifier such as a public land mobile network (PLMN), a mobile country code, a mobile network code, or the like, wherein the network identifier associated with the satellite network is the same or different than the network identifier associated with the cellular network.

When present in the network environment 200, the satellite 204 is generally configured to provide wireless communication service to the UE 206. In aspects where the satellite 204 is a bent pipe type, the satellite 204 may primarily operate by relaying communications between the gateway 202 and the UE 206. In aspects where the satellite 204 is processing or regenerative type, the satellite 204 may handle at least some signal processing, routing, switching, and resource allocation/scheduling on board, while still using a connection to the gateway 202 as a backhaul to the network 208. The satellite 204 communicates with the gateway using the feeder link 210 and communicates with the UE 206 using a user link 220. The user link 220 comprises a forward downlink 224 used to communicate signals from the satellite 204 to the UE 206 and a return uplink 226 used to communicate signals from the UE 206 to the satellite 204. The satellite 204 may communicate with the UE 206 using any wireless telecommunication protocol desired by a network operator, including but not limited to 3G, 4G, 5G, 6G, 802.11x and the like. Though shown as having a single beam providing coverage to a satellite coverage area 222, the satellite 204 may be configured to utilize a plurality of individual beams to communicate with multiple different areas at or near the same time. Similarly, though a single forward downlink 224 and a single return uplink 226 are illustrated, the UE 206 may utilize multiple downlinks and/or multiple uplinks to communicate with the satellite 204, using any one or more frequencies as desired by a satellite or network operator.

Generally, the satellite 204 is characterized by its orbit around the earth. The orbit of any particular satellite will vary by operator desire and/or intended use; for example, a satellite suitable for use with the present disclosure may be characterized by its maximum orbital altitude and/or orbital period as Low Earth Orbit (LEO), Medium Earth Orbit (MEO), and High Earth Orbit (HEO)—also referred to herein as characterizing an orbital plane. Though not rigidly defined, an LEO satellite may orbit with a maximum orbital altitude of less than approximately 1,250 miles, an MEO satellite may orbit with a maximum orbital altitude generally between 1,250 and 22,000 miles, and an HEO satellite may orbit with a maximum orbital altitude of greater than approximately 22,000 miles. In some, but not all cases, a satellite in HEO may be considered geosynchronous (i.e., geosynchronous earth orbit (GEO)) on the basis that its orbital period is approximately equal to the length of a sidereal or solar day (approximately 24 hours); generally, a satellite in geosynchronous orbit will appear to be in the same position relative to a fixed point on the surface of the earth 208 at the same time each day. A geostationary orbit is a special type of geosynchronous orbit with the Earth's equator with each of an eccentricity and inclination equal to zero. Some satellites in HEO and all that are in LEO or MEO have an orbital period that is different than the length of a sidereal/solar day and are considered to be non-geosynchronous and do not remain stationary relative to a fixed position on the surface of the Earth. As used herein, a satellite in LEO has a lower orbital plane than a satellite in MEO or HEO, an MEO satellite has a higher orbital plane than a satellite in LEO, and an HEO satellite has a higher orbital plane than a satellite in LEO or MEO.

In aspects where the RAN of the network environment 200 comprises a terrestrial wireless telecommunication network, the network environment 200 comprises one or more terrestrial base stations, represented by terrestrial base station 230. The terrestrial base station 230 is generally configured to relay communications between the network 208 and one or more UEs, such as the UE 206. The terrestrial base station 230 communicates signals to the UE 206 using a terrestrial downlink 234 and receives signals from the UE 206 using a terrestrial uplink 236. The terrestrial base station 230 may communicate with the UE 206 using any wireless telecommunication protocol desired by a network operator, including but not limited to 3G, 4G, 5G, 6G, 802.11x and the like. Though shown as having a single beam providing coverage to a terrestrial coverage area 232, the terrestrial base station 230 may be configured to utilize a plurality of individual beams to communicate with multiple different areas at or near the same time. Similarly, though a single terrestrial downlink 234 and a single terrestrial uplink 236 are illustrated, the UE 206 may utilize multiple downlinks and/or multiple uplinks to communicate with the terrestrial base station 230, using any one or more frequencies as desired by a mobile network operator.

The satellite 204, ground station 202, or the terrestrial base station 230 are communicatively coupled to the network component 240. The network component 240 may be said to comprise two functionally-defined modules; such a composition is representative only, more or fewer sub-components or modules may be utilized to perform the functionality described herein. Said modules comprise a monitor 242 and a controller 244. Together, the network component 240 allocates radio resources to devices based on one or more of their reported capabilities.

The monitor 242 is generally configured to monitor attached device capabilities and congestion of the serving radio access network node. In order to determine the UE 206's capabilities, the monitor 242 is configured to process a UE capability message received from the UE 206. The UE capability message provides detailed information about the UE 206's technical capabilities, which the serving RAN node (e.g., the terrestrial base station 230, the ground station 202, or the satellite 204) or the network 208 uses to optimize service delivery and resource allocation. The UE capability message is typically sent during the initial attachment process when the UE 206 connects to the serving RAN node or during handover between cells or networks. It can also be requested by the network at any time to reassess the capabilities of the UE 206, particularly when there are changes in network configuration or when the network needs to optimize the allocation of resources. Pertinent to the present disclosure, the monitor 242 may use the UE capability message to determine one or more of a number of multiple input, multiple output (MIMO) layers supported by the UE 206, a supported channel bandwidth supported by the UE 206, a maximum supported bandwidth supported by the UE 206, baseband processing capabilities of the UE 206, and the number of receive antennas or receive chains of the UE 206. In some aspects, the monitor 242 may also be configured to utilize the UE capability message from the UE 206 to determine that the UE 206 is a reduced capability (RedCap) or NR-Light device; as used herein, a RedCap device or NR-Light device is used in the sense defined by release 17 of the 3GPP standards and refers to a UE with fewer antennas, reduced bandwidth support, lower supported modulation schemes and/or simplified MIMO configurations, intended to support lower data rate requirements.

In addition to monitoring device capabilities, the monitor 242 is configured to monitor congestion of the serving RAN node. Though a Mobile Network Operator (MNO) may utilize many different metrics or key performance indicators (KPIs) as a basis for determining that a serving RAN node has high congestion, some representative metrics or KPIs include frequency band utilization, packet loss rate, latency, jitter, a packet error rate, bandwidth utilization, number of connected UEs, and traffic load. The monitor 242 may determine that congestion condition exists based on a determination that one or more metrics of KPIs exceed one or more respective thresholds. Frequency band utilization refers to the proportion or percentage of the available spectral bandwidth within a given frequency band that is actively being used for data transmission. Packet loss rate is the percentage of data packets that are transmitted but fail to reach their destination due to network congestion, errors, or other transmission issues. Latency is the time delay between the transmission of a data packet from the source and its reception at the destination. Jitter is the variation in time delay between consecutive packets arriving at their destination. Packet Error Rate is the ratio of data packets that are received with errors to the total number of packets transmitted. Bandwidth utilization refers to the proportion of the available network bandwidth that is actually being used for data transmission, typically expressed as a percentage. The number of connected UEs refers to the total count of devices that are actively connected and communicating with the serving RAN node at any given time. Traffic load is the total amount of data traffic that the network 208 or the serving RAN node is handling at a given time, including the cumulative data rate.

The controller 244 receives device capability and congestion information from the monitor 242 and is generally configured to make resource allocation decisions for the UE 206 based on the UE having limited capabilities (including being RedCap or NR-Light) and one or more trigger conditions being met. In a first embodiment, a resource allocation decision for the UE 206 is based on the controller 244 determining that the UE 206 is requesting resources on a band or from a RAN node associated with higher capabilities than the UE 206 has (i.e., one or more of the capabilities of the UE 206 are below a predetermined threshold for default/normal service); for example, the UE 206 may be an extended reality (XR) device with two receive antennas and it may be requesting network resources on a band that requires (whether by standards or by MNO choice) four receive antennas. In a second embodiment, a resource allocation decision for the UE 206 is based on the controller 244 determining that the UE 206 is requesting resources on a band of from a RAN node associated with higher capabilities as described above and that the RAN node serving the UE 206 has high congestion as described above. In a third embodiment, a resource allocation decision for the UE 206 is based on the UE 206 having capabilities lower than a predetermined threshold and that the RAN node serving the UE 206 has high congestion—regardless of whether the band or RAN node accessed by the UE 206 requires higher capabilities. In one example of the third embodiment, an MNO may implement resource allocation restrictions on all UEs with two receive antennas during high congestion—regardless of the band or RAN node they are accessing.

On the basis that the UE 206 has satisfied one of the resource allocation trigger conditions described above, the controller 244 may implement one or more mitigating actions. The one or more mitigating actions include adjusting the Quality of Service (QoS) assigned to the UE 206; specifically, based on one or more of the trigger conditions being satisfied, the QoS level of the UE 206 can be reduced. By reducing the QoS level of the UE 206, one or more of the following may occur: the priority level of the UE 206 may be reduced, allocated bandwidth (channel or maximum allocated) may be reduced, latency may increase, access to specific services (e.g., high bandwidth or high-priority services) may be limited or barred, packet loss tolerance may increase, network resource allocation (e.g., physical radio resources) may be reduced. The one or more mitigating actions may take the form of handing over or scheduling the UE 206 to a lower-demand band or RAN node, or to a band or RAN node that that does not have requirements or capability targets that exceed that of the UE 206.

Figure 3:
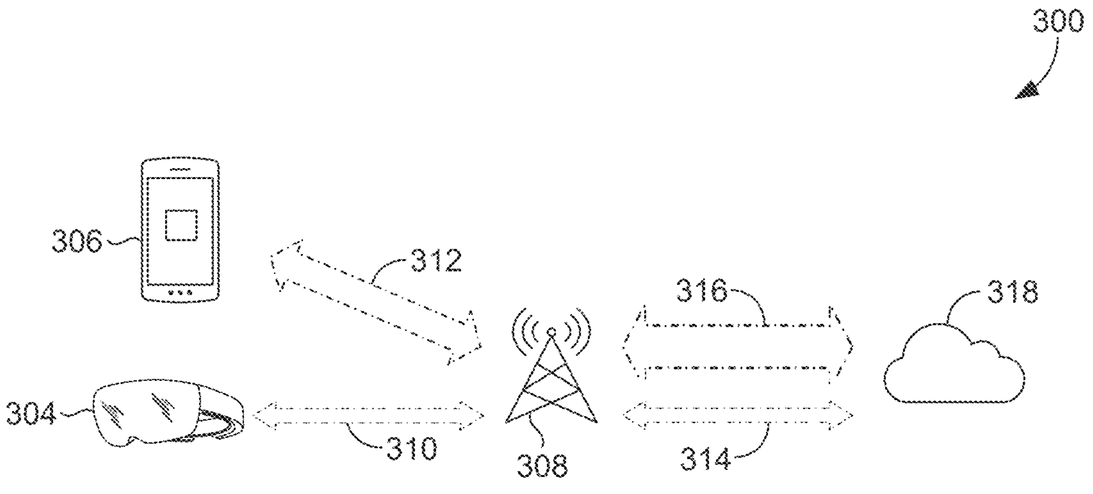
FIG. 3 illustrates a network for use with implementing aspects of the present disclosure.

Turning now to FIG. 3, the one or more mitigating actions may take the form of allocating a lower-performing network slice. FIG. 3 illustrates a simplified network environment 300 that illustrates the allocation of a lower-performing network slice based on one or more of the trigger conditions disclosed herein being satisfied. The network environment 300 comprises a first UE 304 and a second UE 306; each of the first UE 304 and the second UE 306 may comprise any one or more aspects described with respect to the computing device 100 of FIG. 1 and/or the UE 206 of FIG. 2. The network environment also comprises a serving RAN node 308 having any one or more capabilities or characteristics described herein with respect to FIG. 2. The network environment 300 also comprises a network 318, from which resources are requested by each of the first UE 304 and the second UE 206.

For illustrative purposes, the first UE 304 may take the form of an XR device and the second UE 306 may take the form of a modern cell phone. The first UE 304 may be said to have lower capabilities than the second UE 306; the lower capabilities may be strictly relative (i.e., the first UE 304 is "lower-capability" based on a comparison to other UEs accessing the serving RAN node 308), absolute (i.e., the first UE 304 is "lower-capability" based on a comparison to a requirement of the band or the serving RAN node 308), or some combination. As described with respect to FIG. 2, the lower-capability nature of the first UE 304 may be based on a number of multiple input, multiple output (MIMO) layers supported by the first UE 304, a supported channel bandwidth supported by the first UE 304, a maximum supported bandwidth supported by the first UE 304, baseband processing capabilities of the first UE 304, and the number of receive antennas or receive chains of the first UE 304. Based on one or more of the trigger conditions being satisfied, the first UE 304 is assigned a first network slice 314, while the second UE 306 (a higher capability device) is assigned a second network slice 316, wherein the first network slice 314 has fewer network resources, a lower QoS, and/or a lower priority than the second network slice 316. As a result of the differential network slicing assignments, fewer radio resources will be allocated in a first wireless connection 310 between the first UE 304 and the serving RAN node 308 than will be allocated in a second wireless connection 312 between the second UE 306 and the serving RAN node 308.

Figure 4:
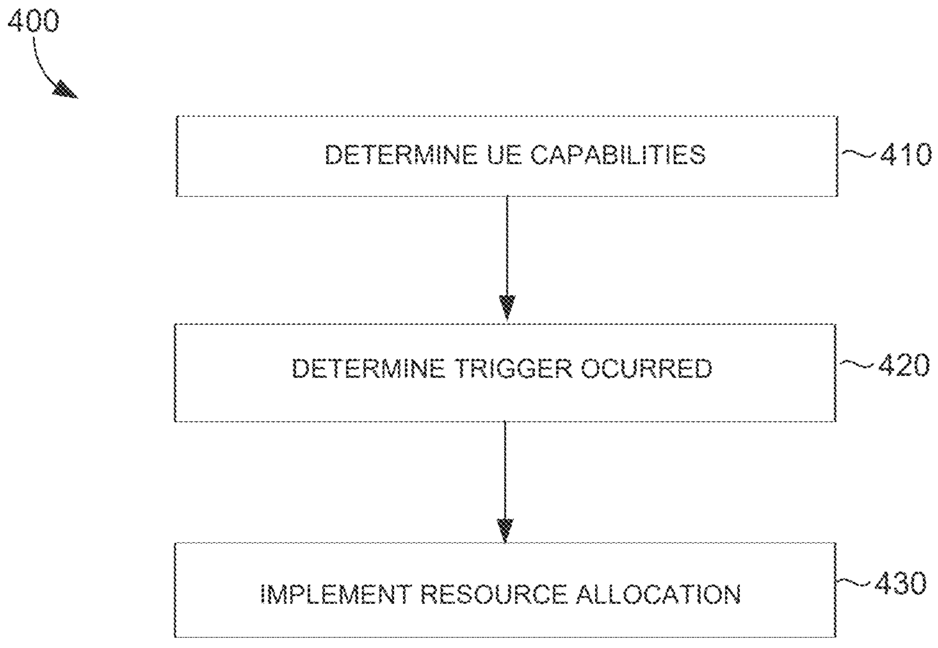
FIG. 4 depicts a flow diagram of a method for use with the aspects of the disclosure described herein.

Turning now to FIG. 4, a method 400 is illustrated for use with the present disclosure. The method 400 begins with a first step 410 wherein UE capabilities are determined to be at or below a threshold, according to any one or more aspects described above with respect to FIGS. 2-3. The method continues with a second step 420, wherein it is determined that one or more trigger conditions have occurred. According to any one or more aspects described with respect to FIGS. 2-3, the one or more trigger conditions may be based on a band or RAN node that the UE is attempting to access, a congestion condition at the RAN node or network, a combination of band/RAN requirements and congestion, or based on a combination of the UE's capabilities and the congestion condition (regardless of whether or not the band or RAN require higher UE capabilities). The method continues with a third step 430, wherein resources are allocated to the UE based on its capabilities and the one or more trigger conditions being satisfied. According to any one or more aspects described with respect to FIGS. 2-3, the UE may be assigned a QoS or network slice that reduces the amount of radio resources that would otherwise be allocated to UEs with higher capabilities.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A system for network resource allocation, the system comprising:

a radio access network (RAN) node configured to receive a capability message from a user equipment (UE); and one or more computer processing components configured to perform operations comprising:

determining, based on the capability message, the UE has one or more capabilities below a pre-determined threshold;

determining that the UE is requesting access to a network resource that requires capabilities greater than or equal to the pre-determined threshold, the network resource being the RAN node or a frequency band of the RAN node;

determining that the network resource has a congestion metric that exceeds a second pre-determined threshold; and based on said determinations, implementing a mitigating resource allocation to the UE.

2. The system of claim 1, wherein the one or more capabilities comprise a number of receive antennas used by the UE.

3. The system of claim 1, wherein the one or more capabilities comprise a number of multiple input, multiple output (MIMO) layers supported by the UE.

4. The system of claim 1, wherein the one or more capabilities comprise a maximum allocated bandwidth.

5. The system of claim 1, wherein the one or more capabilities comprise a maximum channel bandwidth.

6. The system of claim 1, wherein the one or more capabilities comprise a baseband processing capability.

7. The system of claim 1, wherein the congestion metric comprises one or more of a network resource utilization, a packet loss rate, a latency, a jitter, a packet error rate, a bandwidth utilization, a number of connected UEs, and a traffic load.

8. The system of claim 1, wherein the mitigating resource allocation comprises assigning a first network slice to the UE, the first network slice having a lower priority than a second network slice assigned to a second UE based on a determination that the one or more capabilities of the second UE exceed the pre-determined threshold.

9. The system of claim 1, wherein the mitigating resource allocation comprises assigning a first quality of service (QoS) to the UE, the first QoS having a lower priority than a second QoS assigned to the second UE based on a determination that the one or more capabilities of the second UE exceed the pre-determined threshold.

10. A method for network resource allocation, the method, comprising:

receiving a capability message from a user equipment (UE) at a radio access network (RAN) node;

determining, based on the capability message, the UE has one or more capabilities below a pre-determined threshold;

determining that the network resource has a congestion metric that exceeds a second pre-determined threshold; and based on said determinations, implementing a mitigating resource allocation to the UE.

11. The method of claim 10, wherein implementing a mitigating resource allocation to the UE is further based on a determination that the UE is requesting access to a network resource that requires capabilities greater than or equal to the pre-determined threshold, the network resource being the RAN node or a frequency band of the RAN node.

12. The method of claim 11, wherein the congestion metric comprises one or more of a network resource utilization, a packet loss rate, a latency, a jitter, a packet error rate, a bandwidth utilization, a number of connected UEs, and a traffic load.

13. The method of claim 12, wherein the mitigating resource allocation comprises assigning a first network slice to the UE, the first network slice having a lower priority than a second network slice assigned to a second UE based on a determination that the one or more capabilities of the second UE exceed the pre-determined threshold.

14. The method of claim 13, wherein the one or more capabilities comprise one or more of a number of receive antennas used by the UE, a number of multiple input, multiple output (MIMO) layers supported by the UE, a maximum allocated bandwidth, a maximum channel bandwidth, and a baseband processing capability.

15. The method of claim 12, wherein the mitigating resource allocation comprises assigning a first quality of service (QoS) to the UE, the first QoS having a lower priority than a second QoS assigned to the second UE based on a determination that the one or more capabilities of the second UE exceed the pre-determined threshold.

16. The method of claim 15, wherein the one or more capabilities comprise one or more of a number of receive antennas used by the UE, a number of multiple input, multiple output (MIMO) layers supported by the UE, a maximum allocated bandwidth, a maximum channel bandwidth, and a baseband processing capability.

17. A method for network resource allocation, the method, comprising:

receiving a capability message from a user equipment (UE) at a radio access network (RAN) node;

determining, based on the capability message, the UE has one or more capabilities below a pre-determined threshold;

determining that the UE is requesting access to a network resource that requires capabilities greater than or equal to the pre-determined threshold, the network resource being the RAN node or a frequency band of the RAN node; and based on said determinations, implementing a mitigating resource allocation to the UE.

18. The method of claim 17, wherein the one or more capabilities comprise one or more of a number of receive antennas used by the UE, a number of multiple input, multiple output (MIMO) layers supported by the UE, a maximum allocated bandwidth, a maximum channel bandwidth, and a baseband processing capability.

19. The method of claim 18, wherein the mitigating resource allocation comprises assigning a first quality of service (QoS) to the UE, the first QoS having a lower priority than a second QoS assigned to the second UE based on a determination that the one or more capabilities of the second UE exceed the pre-determined threshold.

20. The method of claim 18, wherein the mitigating resource allocation comprises assigning a first network slice to the UE, the first network slice having a lower priority than a second network slice assigned to a second UE based on a determination that the one or more capabilities of the second UE exceed the pre-determined threshold.

* * * * *